United States Patent [19]

Fukushima et al.

[11] Patent Number: 4,763,354
[45] Date of Patent: Aug. 9, 1988

[54] KEY TELEPHONE SYSTEM

[75] Inventors: Hiroshi Fukushima; Teruo Matsufuji, both of Tokyo, Japan

[73] Assignee: Iwatsu Electric Co., Ltd., Tokyo, Japan

[21] Appl. No.: 55,124

[22] Filed: May 28, 1987

[30] Foreign Application Priority Data

Jun. 5, 1986 [JP] Japan .................... 61-129141

[51] Int. Cl.$^4$ ............................................. H04M 1/72
[52] U.S. Cl. .................................... 379/165; 379/166
[58] Field of Search ............... 379/165, 157, 161, 166

[56] References Cited

U.S. PATENT DOCUMENTS 4,650,932  3/1987  Komuro et al. ................... 379/165

Primary Examiner—Stafford D. Schreyer
Attorney, Agent, or Firm—Kinney & Lange

[57] ABSTRACT

A key telephone system comprising a key service unit and a plurality of key telephone sets is configured by this invention so as to permit use of IC cards which are adapted to admit user data for registration therein, to be inserted in any of the key telephone sets for the user data to be read out of the IC card, and to enable the user to utilize the key telephone set.

5 Claims, 5 Drawing Sheets

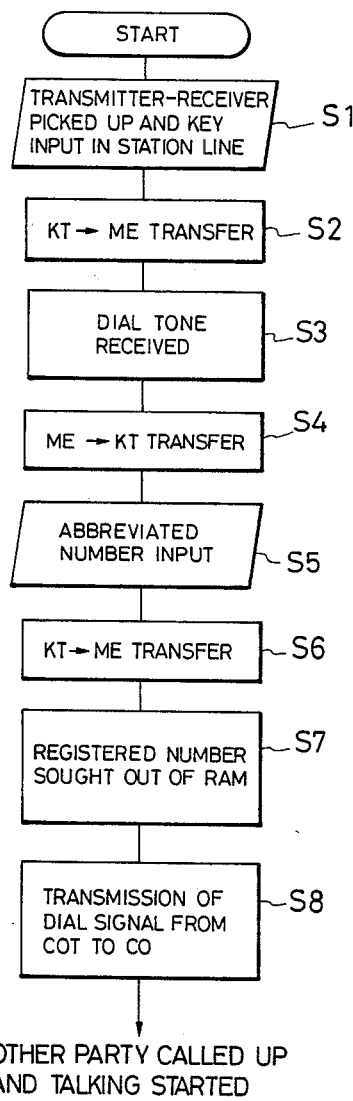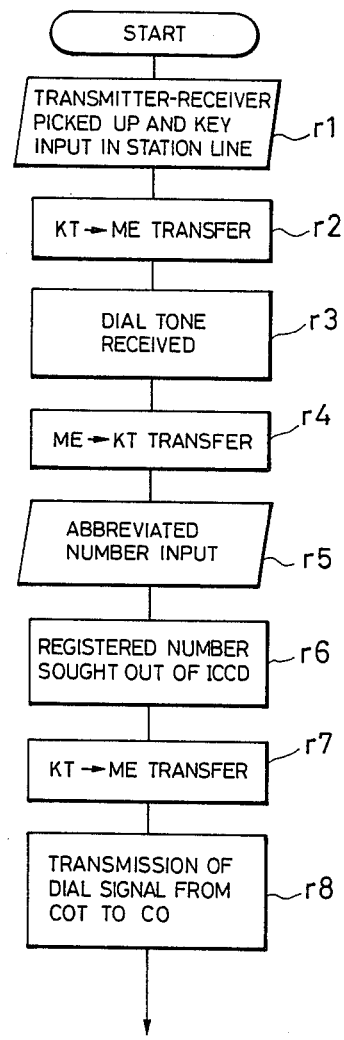

KEY TELEPHONE SYSTEM

BACKGROUND OF THE INVENTION

1. Field of the Invention

This invention relates to a key telephone system. More particularly this invention relates to a key telephone system so configured that every key telephone set in the key telephone system will be enabled to utilize, on the basis of common use, the same abbreviated dialing, automatic dialing, service class, and user data such as extension numbers.

2. Description of the Prior Art

The conventional key telephone system, as widely known, comprises a key service unit and a plurality of key telephone sets connected to the key service unit through connecting cables. In recent years, adoption of electronic devices in the key telephone systems of this class has advanced to a point where their key service units incorporate therein, as a control circuit, a microcomputer (CPU) adapted to effect various controls.

This electronic control circuit is composed of a control circuit (CPU), a read-only memory (ROM) serving to provide the control circuit (CPU) with a program, a random access memory (RAM) functioning to store necessary data and specifying work areas, and various buses such as data bus, address bus, and control lines.

In the key telephone system of the kind incorporating electronic devices as described above, various data are transmitted and received during the transfer of information between the key service unit and the individual key telephone sets. Broadly, these data are classified as being one of the following three kinds.

(1) Control data (control program data) based on the programs forming the foundation of a given system which are of a permanent nature.

(2) General system data established for a given system based on such system functions as setting telephone sets so as to be capable of issuing a sound on reception of a call, setting the dial pattern (DP/MF) of an office line introduced to the key service unit, and setting calendar and clock (hereinafter referred to as "system data").

(3) Individual system data established by, and subject to change by, an individual user in conformity with conditions of use, places of installation, and methods of use on the part of the user, as in assigning numbers (such as *01) for abbreviated dialing, setting dial data corresponding to the assigned numbers, and setting the day-night switch of service class, for example (hereinafter referred to as "user data").

The control data are characteristic of a given system and absolutely invariable. They are fixed in form at the time that the system is shipped as a product from the factory. The system data are such that when a user places an order for a key telephone system including a specification, for example, such that all the key telephone sets are to be adapted to issue a sound on reception of a call, the data are established to conform with the user's order at the time that the system is shipped as a product or at the time that the system is installed in the user's office. The user data are such that, after the system has been installed at a user's office, the data can be freely altered to suit the user's own convenience at any time he pleases.

In the conventional key telephone systems of the kind incorporating electronic devices, more often than not user data corresponding to abbreviated dial function of the aforementioned RAM, automatic dial transmission function, and service class function are established for the individual key telephone sets. In a company, for example, the key telephone system may be configured so that the key telephone set installed in the secretarial section will be put in at a terminal keeping in registers the whole user data and provided with all the possible telephone functions, while in the key telephone sets for all the company employees, Mr. A's telephone set will be so set as to control making of toll transmissions, Mr. B's will be so set as to control the making of automatic dial transmissions and the making toll transmissions, and others will be so set as to control performing functions that are different one from another. The key telephone system may otherwise be configured so that different sets of user data will be provided in separate registers for individual key telephone sets grouped by the unit of department and the unit of section, for example. In the case mentioned above, therefore, Mr. A and Mr. B are compelled to go to the secretarial section and borrow the telephone set installed therein for the purpose of making a toll call and, in the meantime, any of the employees at the secretarial section who has left his own seat is not enabled to make a toll call at Mr. A's or Mr. B's seat.

In the conventional key telephone system, the user data registered in the RAM of the key service unit correspond fixedly to the individual key telephone sets as described above. This fact entails the disadvantage that when a person happens to leave his seat, move to some other person's desk, and borrow the key telephone set there, therefore, he will have restrictions in various functions of the borrowed key telephone set, such as the procedure of transmission, because this key telephone set may possibly be set so as to permit functions different from those of the key telephone set to which he is accustomed at his own seat.

SUMMARY OF THE INVENTION

An object of this invention is to provide a key telephone system which is liberated from the drawbacks of the prior art described above and which is configured so that even when a person wishing to transmit a phone call happens to leave his seat and borrow some other person's key telephone set, he can use the borrowed key telephone set with the same data as the user data of the key telephone set of his own daily use. Another object of this invention is to provide a key telephone system such that any person wishing to make a phone call is allowed to use some other person's key telephone set easily in entirely the same manner as the key telephone set of his own daily use.

To accomplish the objects described above, there is provided according to this invention a key telephone system comprising a key service unit and key telephone sets, which is characterized by having the key telephone sets provided with a connector adapted for an IC card to be freely detachably set therein thereby enabling user data to be registered in the IC card and read out of the IC card through the medium of the connector.

BRIEF DESCRIPTION OF THE DRAWINGS

FIG. 2 is a flow chart to aid in the explanation of the operation of a toll transmission in the conventional key telephone system.

FIG. 8 is a flow chart to aid in the explanation of a method for effecting the operation of a toll transmission according to one embodiment of this invention.

DETAILED DESCRIPTION OF THE PREFERRED EMBODIMENTS

Now, one embodiment of this invention will be described in detail below with reference to the accompanying drawings.

Figure 1:
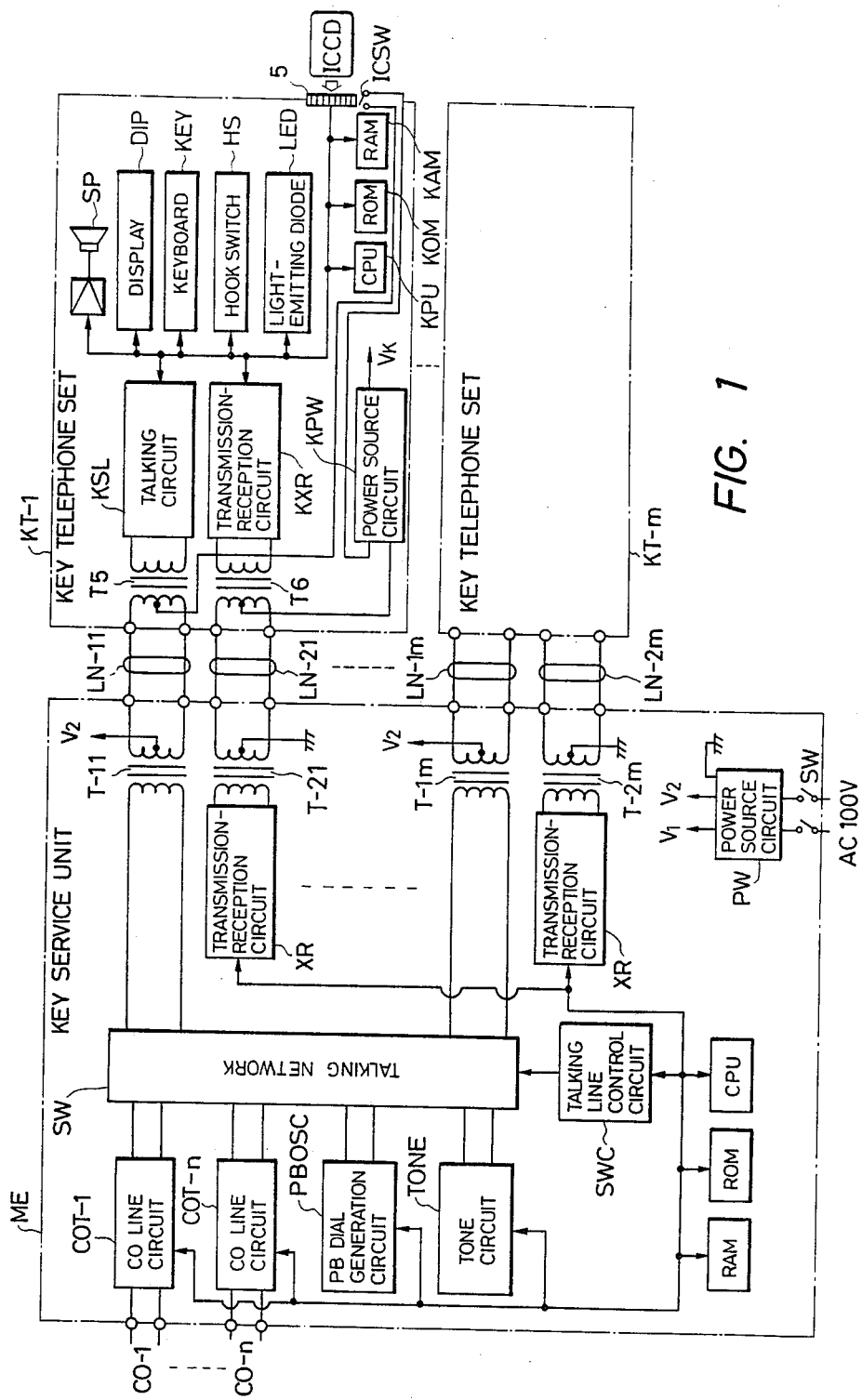
FIG. 1 is a block diagram illustrating one embodiment of this invention.

FIG. 1 is a block diagram illustrating the entire configuration of the key telephone system of the present invention. In this diagram, ME stands for a key service unit, KT-1, ..., KT-m each stands for a key telephone set, CO-1, ..., CO-n each stands for a station line, LN-11, LN-21, ..., LN-1m, LN-2m each stands for a cable for connecting the key service unit ME and the key telephone sets KT-1, ..., KT-m.

In this diagram, the internal construction of the key telephone set KT-m is omitted from illustration because it is the same as that of the key telephone set KT-1.

The key service unit ME is provided with CO line circuits COT connected to station lines CO and a talking network SW which discharges the function of connecting the station lines CO, and a tone circuit TONE serving to generate dial tones and station incoming rings, to the key telephone sets KT, and connecting a PB dial generation circuit PBOSC for feeding out PB dial data to the CO line circuits COT. The key service unit ME is also comprised of a control circuit CPU serving to control the talking network SW through the medium of a talking line control circuit SWC, to control receive incoming data from the CO line circuits COT, and control the operation of the CO line circuits COT. It also comprises, a read-only memory ROM for providing a program to the control circuit CPU, a random access memory RAM keeping record of necessary data, a transmission-reception circuit XR effecting exchange of signal with various key telephone sets KT, and a plurality of transformers T.

A power source circuit PW serves for the key service unit ME. When a power source switch SW is turned on, this power source circuit PW is set feeding electric power to the key service unit ME and all the key telephone sets KT-1 through KT-m. In the present embodiment, since the key telephone sets KT-1 through KT-m are severally furnished with a switch ICSW, the feed of electric power is made only to those key telephone sets whose switch ICSW happens to be turned on.

The key telephone sets KT-1 through KT-m are each comprised of a keyboard KEY including circuit selection keys, numeral designated keys, and key contacts such as * and #. They are further each comprised of, a light-emitting diode LED serving as a display light to indicate the condition of use of a station line or an extension line, a hook switch HS, a display DIP based on liquid crystals, a control circuit KPU controlling a corresponding key telephone set KT, a read-only memory KOM, a random access memory KAM, a transmission-reception circuit KXR effecting exchange of signals with the key service unit ME, a talking circuit KSL, transformers T5 and T6, a speaker SP, and a power source circuit KPW.

Here, the contents of the display DIP are prepared in advance within the random access memory KAM. These contents of KAM are periodically fed out to the display DIP. An alteration of the data of the display DIP, therefore, is effected by writing data meant for the alteration in a corresponding exclusive region of the KAM with the aid of KPU.

The symbol ICCD stands for an IC card which constitutes element of the present invention and contains an integrated circuit. When this IC card is inserted into a connector 5 provided for each of the key telephone sets KT-1 through KT-m, it is electrically and mechanically connected to the selected key telephone set. At this moment, a switch ICSW contained in the connector is turned on to forward the flow of electric power to the power source circuit KPW through the path of power source output $V_2 \rightarrow$ transformer T-11 $\rightarrow$ cable LN-11 $\rightarrow$ transformer T5 $\rightarrow$ switch ICSW $\rightarrow$ power source circuit KPW $\rightarrow$ transformer T6 $\rightarrow$ cable LN-21 $\rightarrow$ transformer T-21 $\rightarrow$ ground. The output voltage $V_k$ of the power source circuit KPW is applied to the various parts of the key telephone set KT-1 to start supplying them power. The construction and function of the IC card will be described in detail later.

The control circuit (processor) CPU of the key service unit ME is operated by a program stored in advance in the read-only memory ROM, and the control circuits (processors) KPU of the key telephone sets KT-1 through KT-m are operated by programs each of stored in the read-only memories KOM.

The tone circuit TONE discharges the function of issuing dial tones, station incoming tones (call tones in the general incoming mode from the station line), extension incoming tones (call tones from some other key telephone set KT-j), lock-out tones, and hold tones. A PB dial oscillation circuit PBOSC generates PB dial data for transmission to the station line.

The control circuit CPU monitors the reception of calls at the station lines CO by making sequential reference to the incoming call detection circuits INC-1, ..., INC-n (not shown) each located in a corresponding one of the CO line circuits COT-1, ..., COT-n. A clock circuit CLK (not shown) discharges the function of clocking the time in which each key telephone set KT-i is engaged in a given call and the calling time (the duration between the time the incoming tone begins to sound and the time the call is answered), for example.

In the general incoming mode, the designation as to which one of the key telephone sets KT-1 through KT-m should be caused to sound a station call tone when a call arrives from the station line is stored in advance in the RAM. Here, it is assumed for the sake of description that the key telephone set KT-m is so designated.

While the system is operating in the general incoming mode, when an incoming call reaches one (CO-i) of the station lines CO-1, ..., CO-n, the incoming call detection circuit INC-i of the corresponding CO line circuit COT-i detects the information of the incoming call and transmits it to the control circuit CPU.

The control circuit CPU reads the key telephone set (KT-m in this case) designated to sound the station call tone from the random access memory RAM and, at the same time, reads out information on selection of the sound source, controls the talking network SW through the medium of the talking control circuit SWC, and transmits the corresponding sound tone from the tone circuit TONE to the key telephone set KT-m.

As a result, the station incoming tone peculiar to the key telephone set KT-m is issued from the speaker SP on the key telephone set KT-m side. At the same time, the light-emitting diode LED corresponding to the incoming station line is switched to steadily emit light or flicker.

When the keyboard KEY is operated to select the station line corresponding to the incoming call and the receiver is picked up to answer the call on the key telephone set KT-m side, the control circuit KPU of the key telephone set KT-m detects the information on station selection and the ON information of the hook switch HS and transmits an answering signal to the control circuit CPU on the key service unit ME side via the transmission-reception circuit KXR, the transformer T6 on the key telephone set side, and the transformer T-2m and the transmission-reception circuit XR on the key service unit ME side.

In response to the operation mentioned above, the control circuit CPU disconnects the tone circuit TONE from the talking network SW, causes the CO line circuit COT-i to form a loop, and connects the station line CO-i via the CO line circuit COT-i, the talking network SW, and the transformer T-1m to the talking circuit KSL of the key telephone set KT-m.

Thus, a talking route is formed between the station line CO-i and the key telephone set KT-m to permit talking on the station line.

Where the received call is desired to be transferred to some other key telephone set such as, for example, the station line KT-1, the hold key included in the keyboard KEY of a key telephone set KT-m is operated and, as the result, the tone circuit TONE is connected via the talking network SW to the CO line circuit COT-i in the state still retaining the station loop. Consequently, the tone circuit TONE issues a hold tone via the station line CO-i and the party receiving the hold tone discerns the hold state and stands by.

When the extension catch key included in the keyboard KEY is subsequently operated, the control circuit CPU controls the talking network SW to effect selection of an idle extension line and the tone circuit TONE issues an extension transmission tone (extension dial tone) to the talking circuit KSL of the key telephone set KT-m. The key telephone set KT-m, on confirming the extension transmission tone, dials the extension number of the party receiving the transfer. The information on this dialing is transmitted to the control circuit CPU of the key service unit ME. The control circuit CPU gains access to the RAM in the key service unit ME for the data corresponding to the key telephone KT-1 and selects the key telephone set KT-1 being called via the talking network SW. As a result, the tone circuit TONE issues an extension call tone to the relevant extension loop.

When the key telephone set KT-1 selects the extension line corresponding to the arriving call and picks up the transmission-reception set in response to the call through the operation of the keyboard KEY, the control circuit KPU of the key telephone set KT-1 detects this information and transmits a response signal to the control circuit CPU of the key service unit ME. The control circuit CPU, on reception of this response signal, disconnects the tone circuit TONE from the talking network SW and stops the extension call tone. At the same time, the control circuit CPU forwards a control signal via the talking control circuit SWC to the talking network SW and interconnects the talking circuit KSL of the key telephone set KT-m and that of the called key telephone set KT-1 through the medium of the talking network SW.

Thus, an extension talking loop is formed and the key telephone set KT-m informs the called key telephone set KT-1 of the fact that the call has arrived from the station line. WHen the called key telephone set KT-1 depresses the station line button corresponding to the station line CO-i through the operation of the keyboard KEY, the information on this status is transmitted to the control circuit and the CO line circuit COT-i is relieved of the hold state mentioned above. As a result, the talking circuit KSL between the station line CO-i and the key telephone set KT-1 is closed to permit talking on the station line.

For the sake of reference, the operation of station line transmission effected by the conventional key telephone system not permitting use of the IC card mentioned above will be described below with reference to the flow chart of FIG. 2. When the transmitter-receiver is picked up on the key telephone set KT-m side and the station line key is depressed to effect selection of a station line (Step S1), the control circuit KPU of the key telephone set KT-m detects this status and transmits a detection signal to the control circuit CPU via the transmission-reception circuit KXR and the transformer on the key telephone set side, the transformer on the key service unit side, and the transmission-reception circuit XR (Step S2).

In response to this operation, the control circuit CPU causes the CO line circuit to form a loop and subsequently connects the station line via the CO line circuit, the talking network, and the transformer to the talking circuit KSL of the key telephone set KT-m which has effected the operation of transmission. Thus, a talking path is formed between the station line and the key telephone set KT-m. As a result, the dial tone from the station line is received by the key service unit ME and then transmitted via the talking path mentioned above to the key telephone set KT-m (Step S3 and Step S4).

When a key on the key telephone set KT-m is operated, after confirmation of the dial tone, so as to feed in an abbreviated code, for example (Step S5), the control circuit CPU of the key service unit receives the information on the key input and gains access to the RAM inside the key service unit for the data corresponding to the key telephone set KT-m (Step S7). In consequence of this access, the data on service class are first read out of the RAM to effect confirmation as to whether the dial information mentioned above is consistent with the functions permitted for the service class or not.

The term "service class" is used for the purpose of defining the range in which the key telephone set is usable. Generally, the service class is divided into the five kinds, international transmission class, toll transmission class, special toll transmission class, local transmission class, and reception-only class. Where the local transmission is registered as the service class, for example, the system is capable of transmitting and receiving local phone calls but incapable of transmitting phone calls to any district outside the district of the local station, namely the phone calls of the specific toll transmission, the toll transmission, and the international transmission.

Where the requirement for service class is satisfied, the control circuit CPU of the key service unit reads the set data (dial data) of the abbreviated dial from the abbreviated code. When the data thus reads out happen to be those of DP (dial pulse) dial, the dial data are transmitted to the CO line circuit. By turning on and off, the CO line circuit effects transmission of the DP dial to the station line. When the data happen to be those of PB (push button) dial, the control circuit CPU of the key service unit actuates the PB dial oscillation circuit PBOSC based on the set data mentioned above. The PB dial data fed out of the PB dial oscillation circuit is forwarded via the talking network SW and the CO line circuit COT to the station line (Step S8).

When the received dial data are those of ordinary kind other than the abbreviated dial or automatic dial, the control circuit CPU of the key service unit forwards the dial data to the station line via the CO line circuit in case the dial data are those of DP dial or via the PB dial oscillation circuit, the talking network, and the CO line circuit in case the dial data are those of PB dial.

When the information fed in through the key of the key telephone set KT-m is not consistent with the functions permitted for service class, the control unit disconnects the CO line circuit from the talking network, connects the tone circuit via the talking network and the transformer of the key service unit to the talking circuit of the key telephone set KT-m, and causes the tone circuit to issue a lock-out tone to the key telephone set KT-m.

Now, the data transmission-reception system between the key service unit ME and the individual key telephone sets KT will be described.

Figure 3:
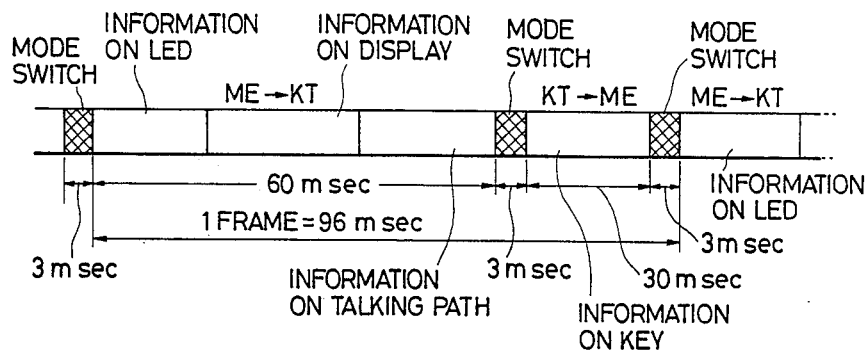
FIG. 3 is a diagram showing a transmission format.

FIG. 3 illustrates the format for the transfer of one frame between the key service unit and the key telephone sets KT.

Between the transmission-reception circuit XR of the key service unit ME and the transmission-reception circuit KXR of the key telephone set KT-m, the information on LED, the information on display, and the information on talking path are sequentially transmitted from the key service unit to the key telephone set KT, in several tens of bytes. Subsequently, the mode is switched and the key telephone set KT transmits the information on key to the key service unit ME in tens of bytes. Thereafter, the mode is switched again and the former mode is executed again. In this manner, the two modes are alternated.

These pieces of the information serve as effective data when there occurs a change in status. In the absence of such a change in status, ineffective data are transmitted. The control circuits CPU and KPU, on receiving the effective data, begin to provide the functions of control.

This transfer of information is effected by repeating cycles of 96 m.sec per frame on the 1 m.sec/bit basis, for example.

The transfer of information from the key service unit ME to the key telephone set KT is effected by using cycles of 60-bits 60 m.sec and the transfer of information from the key telephone set KT to the key service unit ME by using cycles of 30-bits, 30 m.sec, each involving a mode switch using cycles of 3-bits, 3 m.sec.

Figure 6:
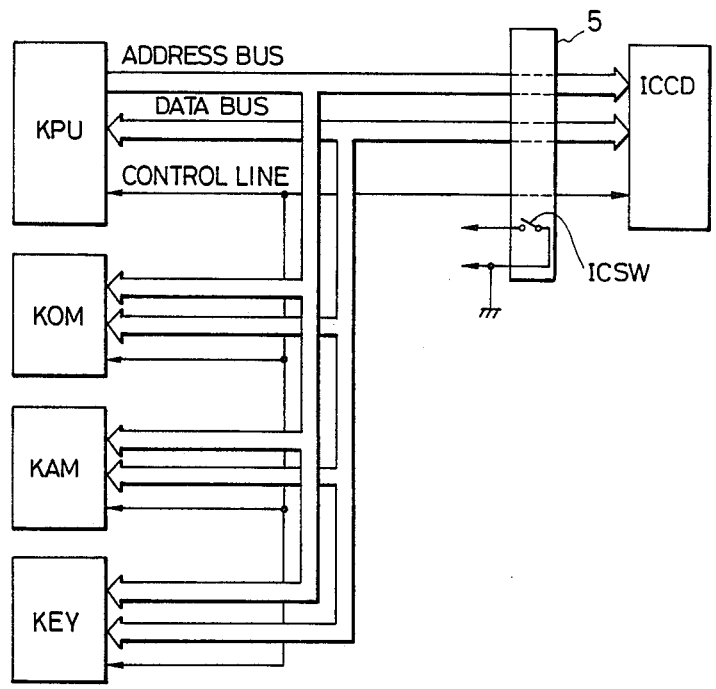
FIG. 6 is a block diagram illustrating an electrical connection between a key telephone set and an IC card.
Figure 4:
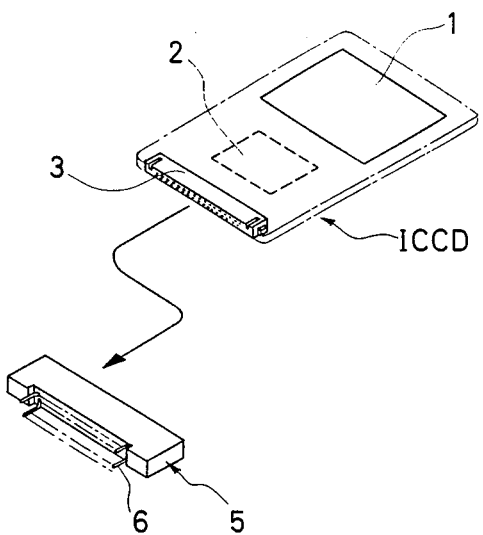
FIG. 4 is a perspective view of an IC card and a connector.
Figure 5:
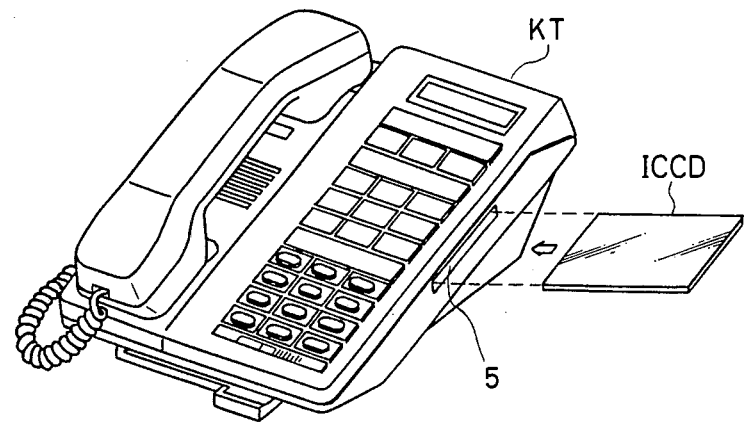
FIG. 5 is a perspective view of a key telephone set adapted to permit setting of an IC card.

Now, the rough construction of the IC card ICCD and the manner of attachment (or connection) thereof to the key telephone set will be described below with reference to FIG. 4, FIG. 5, and FIG. 6. FIG. 4 is a perspective view of the IC card ICCD and the connector, FIG. 5 is a perspective view illustrating the positional relation between a key telephone set and the IC card ICCD to be attached thereto, and FIG. 6 is a block diagram illustrating the electric connection to be formed between the key telephone set and the IC card ICCD when the IC card ICCD is inserted into the connector 5. From FIG. 6, it is clearly noted that the insertion of the IC card ICCD into the connector 5 establishes a mutual connection between the address bus, the data bus, and the control line inside the key telephone set and the address bus, the data bus, and the control line in the IC card ICCD.

The IC card ICCD has roughly the size of a namecard and is composed, as illustrated in FIG. 4, of an embossed region available for inscription, an IC memory 2, and an electrode connector part 3 consisting of a plurality of contacts electrically connected to the memory 2. The connector 5 serving to connect the IC card mechanically and electrically to the key telephone set is provided with a terminal for elastically nipping in position the electrode part 3 of the IC card, a switch ICSW, and a connection part 6 for connection to the bus inside the key telephone set. This connector 5 is fixed at a stated position inside the key telephone set such as, for example, at a position slightly inside from the righthand surface of the telephone set as illustrated in FIG. 5. Optionally two connectors 5, one longitudinal type and the other lateral type, may be prepared and selectively used to suit the manner of use of the IC card.

An electrically erasable and programmable read-only memory (EEPROM) is used as the IC memory 2. Since the EEPROM of such a large capacity as 4 mega-bits has been recently made available, the use of EEPROM raises absolutely no problem from the standpoint of capacity. The connector 5 is adapted for exclusive use in the system contemplated herein. It serves to connect the data bus, the address bus, and the control line (for transmission of chip-select signal, read-write signal, etc) disposed inside the key telephone set to the IC card ICCD. For example, an IC card made by Mitsubishi Electric Corp. and marketed under Product Code of MF4000 or MF500 may be adopted.

Now, the functions of the IC card ICCD which constitutes the principal element of the present invention will be described. First, the method for registering user data in the IC card ICCD will be described with reference to the flow chart of FIG. 7.

Table 1 shows typical items for setting the abbreviated dial number, which forms one piece of user data.

(TABLE 1)

| Content of registration: Type of system data | Registered data | | |
| --- | --- | --- | --- |
| | Registration code | Abbreviated number code | Dial data of other parties for telephone communication |
| Abbreviated dial number to be set | 33 | 01 | 03-334-1111 |
| | | 02 | 0243-55-3525 |
| | | 03~ | 06-338-2231 |
| | | 10 | 0947-44-6100 |

First, the IC card ICCD is inserted into the key telephone set in the direction of the arrow in FIG. 5. Then, the operator performs the following operation.

Figure 7:
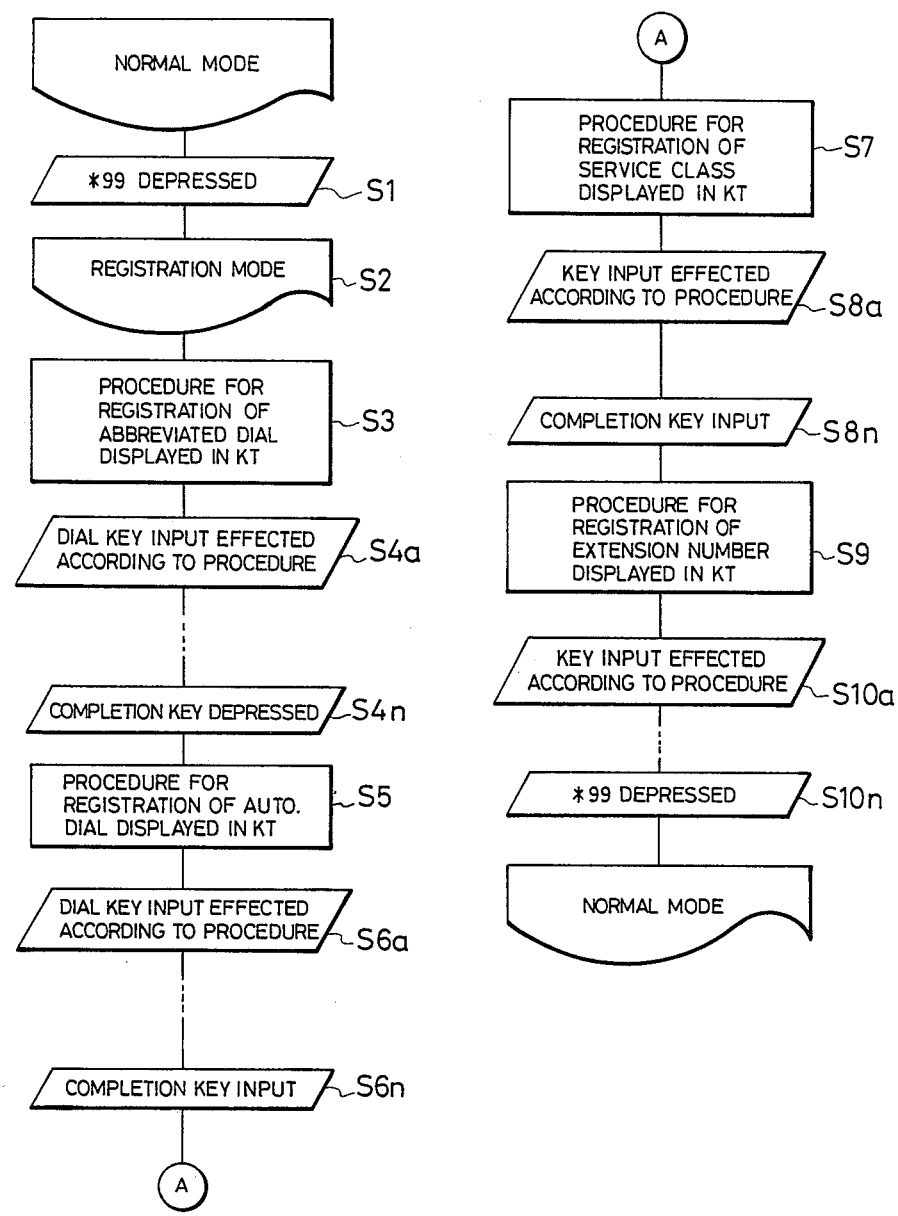
FIG. 7 is a flow chart to aid in the explanation of a method for registering user data in the IC card.

First, in the normal mode, the keys placed on the console are sequentially depressed in the order of "*", "9", and "9" (Step S1 in FIG. 7).

As the result, the key telephone set is placed in the registration mode (Step S2) and the procedure for registration of the abbreviated dial is indicated in the display DIP of the key telephone set KT (Step S3). The operator feeds the dial key in accordance with the displayed procedure of registration and inputs the completion key finally, with the result that the abbreviated dial data are entered in registers in the IC memory of the IC card ICCD (Steps S4a through S4n).

When this registration is completed, the procedure for registration of auto dial is indicated in the display DIP of the key telephone set KT. When the operator feeds the dial key and finally inputs the completion key in accordance with the displayed procedure of registration, the auto dial data are entered into registers in the IC memory 2 of the IC card ICCD (Steps S6a through S6n).

Subsequently, the procedure for registration of the service class is indicated in the display of the key telephone set KT (Step S7) and the operator effects the key operation in accordance with this procedure, the data on the service class is entered into registers in the IC card ICCD (Steps S8a through S8n). Subsequently, the procedure for registration of the extension number is indicated in the display of the key telephone set KT (Step S9) and the operator effects the operation of keys (Step S10a) in accordance with the displayed procedure and finally depresses the keys, "*", "9" and "9" in the order mentioned (Step S10n), the extension number data are entered into registers in the IC card ICCD. Then, the key telephone set returns to the normal mode.

In consequence of the operation described above, the user data comprising the abbreviated dials, the auto dials, the service class, and the extension numbers are registered in the IC card ICCD. Thus, the user data of a varying kind are sequentially registered by a fixed procedure.

The abbreviated dial and the auto dial data (telephone numbers) have maximum sizes of 16 to 20 digits. These dial data are stored in one memory area in the IC card comprising one unit of storage. The IC card ICCD permits registration in at least 100 such dial data units. Further, the service class and the extension numbers are registered in the form of 4- to 8-bits of data per IC card. In addition, the IC card has an area several bytes in size reserved for storage of information of the nature desired to be remembered or preserved for future use.

The recording of data at the steps, S4a, S6a, S8a, and S10a is carried out as follows. The addresses held in the IC card at the time the registration is made have been stored in advance in accordance with the procedure of registration in the KOM of FIG. 6. When the dial key input is effected in accordance with the procedure, this input is temporarily written in the internal register of the KPU. Subsequently, the contents of is internal register are read out into the data bus and the register addresses in the IC card are fed out into the address bus and the control signals (chip select and write signals) are fed out into the control line. As the result, the data read out into the data bus are stored at the designated addresses in the IC card ICCD through the medium of the exclusive connector 5.

When the key input data are to be registered in the IC card ICCD after they have undergone a processing of some form or other, they are temporarily written in the KAM and subjected to a necessary arithmetic processing. The processed data are similarly read out and the register addresses in the IC card are read out into the data bus and the control signals are fed out into the control line. Thus, the data are registered at the designated addresses of the IC card.

Now, the operation to be carried out when the station line transmission is effected by inserting the IC card having the user data already registered therein into the key telephone set will be described below with reference to FIG. 1, FIG. 6, and FIG. 8.

When the user inserts his own IC card ICCD into the key telephone set KT-i installed at someone else's seat and not the key telephone set installed at his own seat, the control circuit KPU of the key telephone set KT-i reads a specific set of data out of the IC card ICCD in accordance with the address and writes the data in the random access memory KAM of the key telephone set KT-i for temporary storage. Then, the contents thus written in the KAM are transmitted, in accordance with the format of transfer shown in FIG. 3 and at the timing of KT→ME, via the transmission-reception circuit KXR, the transformer T6, the transformer T-2i on the key service unit ME side, and the transmission-reception circuit XR, to the control circuit CPU. The control circuit CPU, on receiving the data mentioned above, accumulates the specific set of data mentioned above at the addresses in the RAM of the key service unit ME corresponding to the key telephone set KT-i. As the result, the data inside the key service unit ME corresponding to the key telephone set KT-i are converted into the specified data registered in the IC card ICCD. The specific data are such system data as the sound KT issued on reception of an incoming call and the type of station line introduced (DP/PB or DTFM).

When the user subsequently picks up the transmitter-receiver and selects the station line by depressing the corresponding station line key (Step r1), the control circuit KPU of the key telephone set KT-i detects the operation just carried out and transmits a detection signal via the transmission-reception circuit KXR and the transformer on the key telephone set side and the transformer and the transmission-reception circuit XR on the key service unit ME side to the control circuit CPU (Step r2).

In response to the operation, the control circuit CPU causes the CO line circuit to form a loop and then connects the station line via the CO line circuit, the talking network, and the transformer to the talking circuit KSL of the key telephone set KT-i which has completed an operation of transmission. As the result, the dial tone from the station line is received in the key service unit ME and transferred thence to the key telephone set KT-i (Steps r3, r4).

When the user makes a phone call with the user data of his daily use such as, for example, an abbreviated number code (ex. abbreviated key +9+0) through the key operation of the key telephone set KT-i (Step r5), the control circuit KPU analyzes the information of the key input, gains access to the data stored in the IC card ICCD, reads the dial data corresponding to the key input out of the IC card. The control circuit KPU, thereafter, reads out the data on service class from IC card and effects confirmation as to whether or not the dial information is consistent with the functions permitted for service class (Step r6).

When the consistency with the service class is confirmed, the control circuit KPU transmits the read dial data via the transmission-reception route of KT→ME to the control circuit CPU on the key service unit side (Step r7).

The control circuit CPU on the key service unit side, on receiving the dial data, reads out the station line class data and determines the kind of the station line. When the station line is found to be that of DP dial, the control circuit CPU transmits the dial data to the CO line circuit COT and, by causing the loop of the CO line circuit COT to be turned on and off, transmits the DP dial to the station line. When the station line is found to be that of DTMF dial, the control circuit CPU operates the PB dial oscillation circuit PBOSC in accordance with the dial data mentioned above and transmits the data signal via the PB dial oscillation circuit PBOSC, the talking network SW, and the CO line circuit COT to the station line CO (Step r8).

When the dial data received are of the ordinary type other than the abbreviated dial and the auto dial, the control circuit CPU of the key service unit transmits the dial data to the station line via the CO line circuit in case the dial data are those of DP dial or via the PB dial oscillation circuit, the talking network and the CO line circuit in case the dial data are those of PB dial.

Conversely, when the dial information fed in through the operation of the user dial is that of a service class incapable of station line transmission (restricted station line transmission), the control circuit CPU disconnects the CO line circuit from the talking network, connects the tone circuit TONE via the talking network SW and the transformer T-li of the key service unit to the talking circuit to the key telephone set KT-i, and causes the tone circuit TONE to issue a lock-out tone.

In the case of the station line transmission, the control of the relevant operation in the conventional system has been wholly carried out by the CPU on the key service unit side. The present invention has the advantage that the processing on the control circuit CPU on the key service unit side is alleviated because the data such as abbreviated dial and auto dial are transferred to the IC card on the key telephone set side as clearly noted through comparison of FIG. 2 and FIG. 8.

The key telephone set of the present embodiment is such that when the data of service class, among the user data registered in the IC card ICCD, are those of the local transmission class, any key telephone set KT having the IC card inserted therein is allowed by the program control to effect local transmission, station line transmission, and transferred transmission through the retained station line and also enabled to use the abbreviated dial, auto dial, and extensions. The key telephone set which has no IC card ICCD inserted therein is not allowed to utilize all these functions because it lacks power supply.

The embodiment described above represents a case in which the present invention is applied to a key telephone system comprising a key service unit and key telephone sets separated from the key service unit. This invention is not limited to the key telephone system of this particular configuration. Naturally, this invention can be applied to an independent telephone set or to the so-called parent key telephone system having a key service unit and key telephone sets arranged in an integrated manner. All such applications are embraced in the present invention.

As is clear from the foregoing description, the present invention brings about the following effects.

(1) When a person wishing to make a phone call uses a key telephone set installed at someone else's seat, he inserts his IC card having user data registered therein into this key telephone set. Consequently, the user data registered in the IC card are read out by the control circuit KPU of this key telephone set and the key telephone set effects an operation of transmission based on the user data. Thus, the person is enabled to make the phone call through the key telephone set installed at the other person's seat in the same way as he daily operates his own key telephone set installed at his seat. For example, the abbreviated number code of his daily use can be used on this key telephone set. Further, since the service class is the same as that of his own daily use, he can make the phone call freely within the district in which his key telephone set is allowed to transmit phone calls.

(2) Since the key telephone set not allowed to transmit any phone call unless it has an IC card inserted therein, cost-conscious management of the telephone system can be executed with ease.

(3) As compared with the conventional key telephone system in which the data such as of abbreviated dial and auto dial are recorded in the random access memory RAM on the key service unit ME side and all the relevant operations are controlled solely by the control circuit CPU, the key telephone system of the present invention enjoys the advantage that the processing performed by the control circuit CPU on the key service unit ME side is alleviated because the data such as of the abbreviated dial and the auto dial are stored in the IC card to be inserted in the telephone set and the control circuit KPU on the telephone set side is adapted to effect conversion of the abbreviated number code to the dial data and to check whether or not the consistency condition with the service class is fulfilled.

What is claimed is:

1. A key telephone system comprising a key service unit and a plurality of key telephone sets further comprising an IC card having user data registered therein and an IC card connector fixed in position within each of said key telephone sets in said plurality thereof and connected to an address bus, a data bus, and a control line provided in its corresponding said key telephone sets, said IC card connector adapted to receive therein said IC card, wherein registration of user data in said IC card and reading of said user data from said IC card are effected through the medium of said IC card connector.

2. The key telephone system according to claim 1, wherein said IC card is adapted so as to be freely attached to and detached from said IC card connector and to turn on and off a switch in said key telephone set to control application of power from a power source to said key telephone set in consequence of said attachment and detachment of said IC card.

3. The key telephone system according to claim 1, wherein said user data comprise at least one set of data selected from among abbreviated dial data, automatic dial data, service class data, and extension number data.

4. The key telephone system according to claim 1, wherein a control circuit in said key telephone sets is adapted to effect conversion of abbreviated number codes for intended receivers of telephone calls to corresponding dial data for telephone calls to such receivers.

5. The key telephone system according to claim 1, wherein uses permitted a user of said key telephone system are categorized in service classes with each user being permitted those uses in service classes assigned thereto, and wherein a control circuit in said key telephone sets is adapted to check whether or not a use being attempted by a user is consistent with a service class assigned to that user.

* * * * *